Feb. 1, 1927.
A. J. BREEDEN
LAWN SWEEPER
Filed Feb. 1, 1926
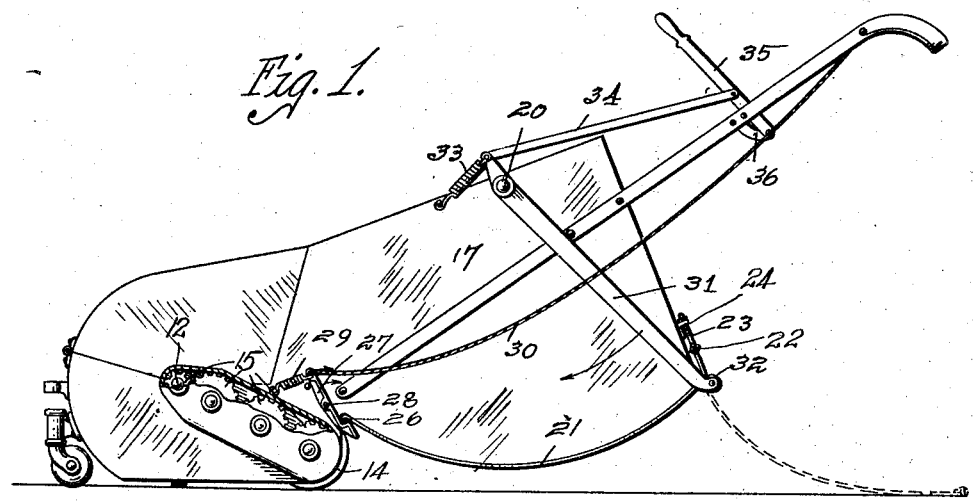
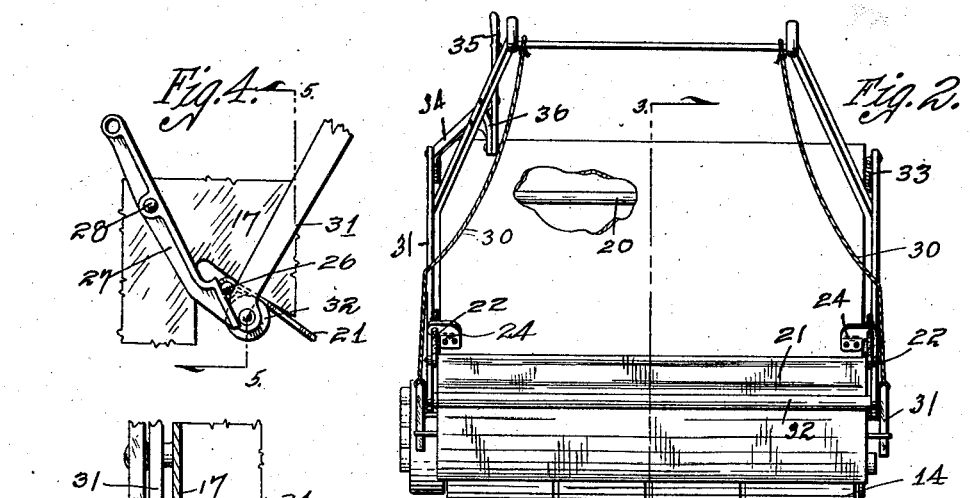
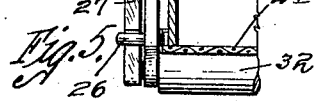
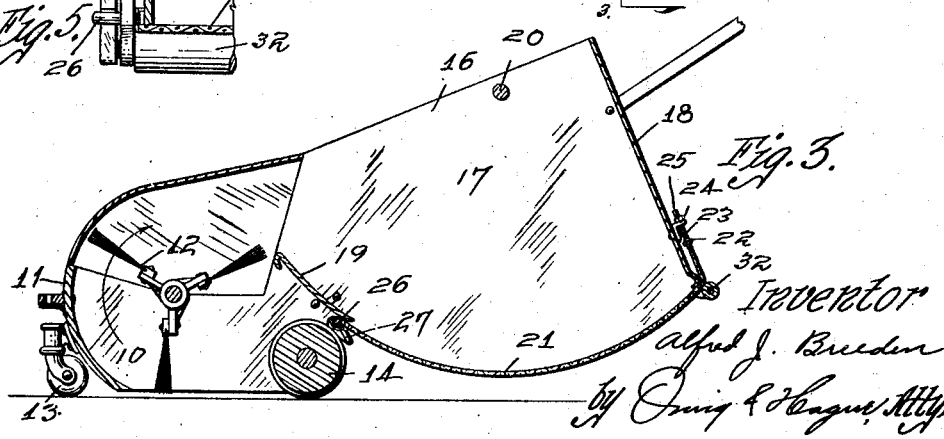

Patented Feb. 1, 1927.

1,615,928

UNITED STATES PATENT OFFICE.

ALFRED J. BREEDEN, OF GRINNELL, IOWA.

LAWN SWEEPER.

Application filed February 1, 1926. Serial No. 85,259.

The object of my invention is to provide a catcher which may be attached to a lawn sweeper or the like for the purpose of receiving a comparatively large amount of the sweepings, and which is provided with means whereby the sweepings may be easily and quickly discharged.

More specifically it is the object of my invention to provide in a catcher for lawn sweepers improved means for dumping the sweepings, such as leaves and the like.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved mechanism.

Figure 2 is a rear elevation of the same.

Figure 3 is a detail sectional view taken on the line 3—3 of Figure 2.

Figure 4 is a detail view of the mechanism for locking the dumping device in a closed position.

Figure 5 is a detail sectional view taken on the line 5—5 of Figure 4.

In the drawings I have used the reference numeral 10 to indicate a sweeper mechanism of the ordinary construction, which is provided with a casing 11 in which is mounted a rotary brush 12. The forward end of the casing is supported by caster wheels 13 while the rear end of said casing is supported by means of a roller 14. The brush 12 is driven in a clockwise direction, as indicated by the arrow in Figure 3, by means of the gear mechanism 15 which is operated from the roller 14.

Secured to the rear end of the casing 11 is a hopper 16 having side members 17 and a back member 18. A front plate 19 is supported between the front ends of the wall members 17 and above the roller 14. That portion of the lower edge of the side members between the rear edge of the plate 19 and the lower edge of the back member 18 are formed circular, the centers of which are provided with a transversely arranged shaft 20 mounted in the upper edges of the side members 17. The bottom of the hopper 16 comprises a piece of pliable material such as canvas 21, one end of which is provided with a rod 22 secured to the back 18 by means of screw threaded bolts 23, said bolts being mounted in brackets 24, each of which is provided with a nut 25. The opposite or forward edge of the member 21 is provided with a rod 26 designed to rest adjacent to the rear edge of the plate 19, by means of suitable hooks 27, to cause the said member 21 to be drawn taut against the lower and curved edges of the side members 17, and thereby form a bottom for the said hopper. Each of said hooks 27 is pivotally mounted to the outer face of an adjacent side member 17 by means of a pivot 28. A spring 29 is provided for yieldably supporting each of the hook members in a closed position. The canvas 21 may be drawn taut by means of the bolts 23 and the nuts 25. The parts are so arranged that the canvas 21 will be supported above the ground when in a closed position.

After the hopper 17 has been filled all that is necessary to do to dump the device is to cause the hook members 27 to disengage the rod 26 by means of suitable ropes 30. It will then be seen that the forward end of the canvas 21 will engage the ground surface on account of the weight of the material above.

It will further be seen that after the sweeper is advanced, the material contained therein and the canvas will be rolled backwardly to the position shown by dotted lines in Figure 1, which provides a positive means for dumping leaves, dry grass or other heavier material.

For returning the canvas 21 to a closed position, I have provided on each end of the rod 20 a downwardly and rearwardly extending arm 31, the lower end of said arms being provided with a roller 32 pivotally mounted therein. The roller 32 is designed to rest adjacent to the under surface of the member 21 and beneath the lower edge of the member 18 when in its normal position, said roller being yieldably retained in said position by means of suitable springs 33 which are connected to the upper end of the arms 31. The upper end of each of the arms 31 is provided with a link 34 which extends rearwardly and is pivotally connected to an operating lever 35, the lower end of which is pivotally connected to a bracket 36. When it is desired to return the member 21 to a closed position, the upper end of the lever 35 is grasped and moved rearwardly, which will cause the lower ends of the arms 31 to be moved forwardly and with it the roller 32, causing the member 21 to be folded adjacent to the curved portions of the members 17 and the rod 26 to be moved into engagement with the hook members 27.

The parts are so arranged that the forward edge of the arm 31 will engage the rod 26 in the manner clearly shown in Figure 4, while the roller 32 will support the canvas and the rod 26 against downward movement, causing the ends of said rods 26 to engage the hook members 27 in such a manner that said rod 26 may be moved to a position in said hooks, and at the same time stretch the canvas taut against the lower edge of the members 27.

It will be seen that the roller 32 will be caused to move into engagement with the lower edge of the member 17, the pivot center of the arms 31 being in a common center with the lower edges of the curved portions of the members 17.

Thus it will be seen that I have provided a dumping mechanism for lawn sweepers and the like of simple, durable and inexpensive construction, which is particularly adapted to handle light material such as dried lawn cuttings and leaves.

There are quite a number of dumping devices on the market for the purpose of receiving and dumping these sweepings, but I have experienced great difficulty with these devices on account of the material being so light that it does not dump readily. By providing the pliable bottom of canvas material, mounted in the manner herein disclosed, I have provided means whereby the dumping of light materials is easily and quickly accomplished.

I claim as my invention:

1. In combination with a sweeper designed to be advanced over the ground surface, a hopper attached thereto and supported above the ground surface and adapted to receive material delivered from said sweeper, said hopper being provided with an opening having back and front edges in its bottom, a pliable bottom member for said opening having its back edge secured to the back edge of said opening, the opposite edge of said pliable member being detachably secured to the front edge of said opening, means for releasing the last said edge of said pliable member to permit it to fall to the ground surface by gravity and to be turned under its opposite edge secured to the hopper as the sweeper is advanced over the ground surface.

2. In combination, with a sweeper designed to be advanced over the ground surface, a hopper attached thereto for receiving material discharged from said sweeper, said hopper having side members, front and back end members and an open bottom, a pliable bottom for said hopper having one edge secured to the lower edge of said back end member, a bar for securing the opposite end of said pliable bottom member adjacent to the lower edge of said front end member, means for latching said bar in said position, and means for releasing said latching means to permit said bar and the forward end of said pliable bottom to fall to the ground surface and to be turned under the back edge of said bottom member as the sweeper is advanced over the ground surface.

3. In combination, a sweeper designed to be advanced over the ground surface, a hopper attached to said sweeper for receiving material therefrom comprising side members, a front and a back end member, the lower edge of each of said side members being circular, a pliable bottom member having its rear edge secured to the lower edge of said back end member, the forward edge of said bottom member being provided with a rod, hook devices for supporting said rod to a position beneath the lower edge of said front end member, means for yieldably retaining said hook devices in their closed position, means for releasing said hook devices from said rod, the parts being so arranged that when the said rod is released from said hook devices the pliable member will engage the ground surface and will be rolled rearwardly beneath the lower edge of said back member, and means for returning the said pliable bottom member to a closed position.

4. A hopper attachment for sweepers comprising substantially parallel side members and front and back end members, the bottom end of said hopper being provided with an opening, a flexible bottom member designed to close said opening, one edge of said bottom member being secured adjacent to the lower edge of one of said end members, the opposite edge of said flexible bottom being provided with a bar, latch devices for securing said bar adjacent to the lower edge of the other one of said end members with the said bottom member stretched taut against the lower edge of said side members, and means for releasing said latch devices to permit said bar and the adjacent end of said flexible bottom member to fall downwardly to empty said hopper.

5. A hopper attachment for sweepers comprising substantially parallel side members and front and back end members, the bottom end of said hopper being provided with an opening, a flexible bottom member designed to close said opening, one edge of said bottom member being secured adjacent to the lower edge of one of said end members, the opposite edge of said flexible bottom being provided with a bar, latch devices for securing said bar adjacent to the lower edge of the other one of said end members with the said bottom member stretched taut against the lower edge of said side members, means for releasing said latch devices to permit said bar and the adjacent end of said flexible bottom member to fall downwardly to empty said hopper, and lever devices for returning said bar to said latched position.

6. In combination, a sweeper designed to be advanced over the ground surface, a hopper attached to said sweeper designed to receive material from said sweeper having sides, a front and back end member, the lower edges of said side members being circular, a flexible bottom for said hopper, means for adjustably supporting one edge of said flexible bottom member, means for detachably supporting the opposite edge of said bottom member, means for actuating said supporting means, a shaft arranged transversely in the upper edges of said side members and in a common center of its circular edges, a downwardly and rearwardly extending arm on each end of said shaft, a roller carried by the lower end of said arm and mounted beneath said flexible bottom member, a spring for retaining the lower ends of said arms in their rearward position of movement, a lever mechanism for swinging the lower ends of said arms and said roller forwardly.

ALFRED J. BREEDEN.